L. H. Morrill.
Horse Rake.
No. 83,875.            Patented Nov. 10. 1868.
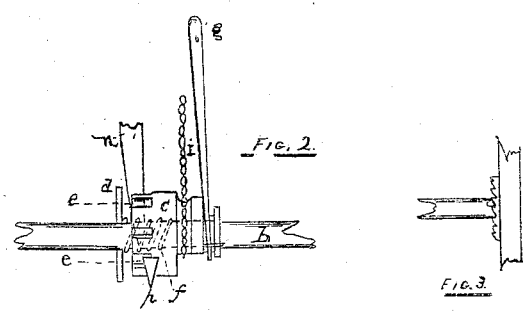
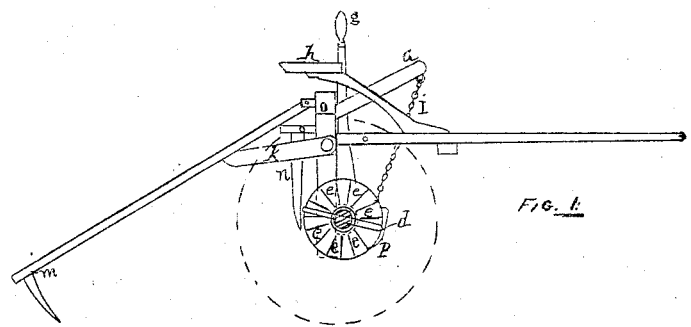
Witness          Inventor
M. Frank Seavey          L. H. Morrill
Henry C. Houston      Per W. H. Clifford Atty

L. H. MORRILL, OF WEST CUMBERLAND, MAINE.

Letters Patent No. 83,875, dated November 10, 1868.

IMPROVEMENT IN HORSE-RAKES.

The Schedule referred to in these Letters Patent and making part of the same.

*To all whom it may concern:*

Be it known that I, L. H. MORRILL, of West Cumberland, in the county of Cumberland, and State of Maine, have invented a new and useful Improved Rake; and I hereby declare the following to be a full, clear, and exact description thereof, which will enable others to make and use my invention, reference being had to the accompanying drawings, forming part of this specification, in which—

Figure 1 is a side elevation, with one wheel removed, so as to show the clutch.

Figure 2 is a front view, in detail, of the clutch on the axle.

Figure 3 is an edge view of the attachment of the wheels to the axle.

My improvement relates to a method of more easily elevating the teeth of a horse-rake, when, in moving across the field, and collecting the hay as it lies on the ground, it reaches a windrow where the amount collected is to be deposited. The whole head has then to be elevated, to let the accumulated hay rest on the windrow, and so remains until the teeth of the rake have passed over the row.

This is ordinarily done by simply pressing upon a lever, $a$, by the weight of the driver, or by the exertion of strength on the lever sufficient to raise the teeth from the ground. This is laborious and difficult. My invention seeks to relieve the driver of this work, and have it accomplished by the draught-animal, or, in other words, by the movement of the wheels of the rake.

$b$ is the axle of the rake. Upon this axle is the sliding clutch $c$.

$d$ is a pin set on the axle.

$e$ are recesses on the end of the clutch next to the pin $d$.

$f$ is a spring that tends to keep the clutch pressed away from the pin $d$.

When the recesses $e$ are not engaged with the pin $d$, the axle $b$ turns within the clutch, and does not carry it around.

$g$ is a lever with a fulcrum against the frame of the rake, by means of which the clutch $c$ can be pushed up, so as to insert the pin $d$ in one of the recesses $e$. This is effected by simply pushing the lever from the driver's seat, $h$. When so pushed, it is evident that the clutch, being engaged with the pin $d$, will be carried around with the axle $b$ in its revolution.

Attached to the clutch $c$ is the chain $i$, which is connected with the lever $a$. As the axle revolves, and carries with it the clutch $c$, one of the recesses $e$ being pressed over the pin $d$, the chain $i$ is wound around $c$, and thus the end of the lever $a$ drawn downward.

This lever $a$ is connected with the lifting-arms $k$, as common, and as its forward end is drawn down, it lifts at the back end of the lifting-arms $k$, and so lifts up the teeth $m$.

When the windrow is passed, it is desirable that the clutch should be released from the pin $d$, and this is effected as follows, even if the driver continues to draw on the lever or arm $g$ longer than necessary.

$n$ is a vertical arm extending down from the frame $o$ of the rake, in the centre of the same, to the axle.

$p$ is a wedge-shaped dog attached to the clutch. When the clutch and pin $d$ are engaged, and the clutch revolves with the axle, it will continue to do so until the wedge-shaped dog $p$ comes in contact with the vertical arm $n$, when, by the slope of the dog $p$, the clutch will be pushed back, the lever $a$ will rise, and the teeth $m$ drop again.

The clutch can be made of such size as thus to lift the teeth just long enough for the purpose of passing over the windrow, and then to let them drop again.

Thus the driver is released from the labor of lifting the entire head of the rake, this being accomplished by the motion of the rake and the draught of the animal.

I do not claim a device in which a ratchet-wheel is attached to one of the supporting-wheels, upon which is loosely fitted a sleeve provided with an arm, connected by a rod to the rake-head, and with a pawl pivoted to the arm, which, by spring-levers and a bent rod, is forced to engage with the ratchet at pleasure, thereby carrying forward the arm and raising the rake. A stop on the axle disengages the pawl. The operation of mine is different from this, because I use no ratchet or pawl, and the disengagement is effected by a small inclined plane on one part of the clutch. Moreover, my invention is not attached to the side of the rake or one end of the axle, but to the centre. This makes the draught even on both sides. When the device that lifts the rake is attached to one end of the axle, instead of at the centre of the axle, the strain that lifts the rake bears unevenly on the cattle, and it is this that my invention seeks to avoid.

A similar difference exists between my invention and the patent of Daniel G. Adelsberger, January 23, 1866. The same peculiarity is seen in the patent of S. R. Nye, March 13, 1866. In the patent of J. A. Shineman, October 8, 1867, the attachment is also to the rake-wheels.

What I claim as my invention, and desire to secure by Letters Patent, is—

The sliding-clutch $c$ on the axle $b$, together with its spring $f$, chain $i$, lever $g$, and pin $d$, set in the axle $b$, all as and for the purposes set forth, the clutch being attached to the axle at the centre, to make the draught upon the cattle even when the rake-head is being lifted.

L. H. MORRILL.

Witnesses:
W. H. CLIFFORD,
WM. FRANK SEAVEY.